(12) United States Patent
Haba

(10) Patent No.: US 6,428,170 B1
(45) Date of Patent: Aug. 6, 2002

(54) OPTICAL PROJECTOR WITH IMAGE ENLARGING AND PROJECTING CAPABILITY AND HEAT INSULATING AND COOLING MEANS

(75) Inventor: Shinji Haba, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/525,257

(22) Filed: Mar. 14, 2000

(30) Foreign Application Priority Data

Apr. 15, 1999 (JP) .......................................... 11-108257

(51) Int. Cl.[7] .................. G03B 21/14; G03B 21/18; G03B 21/16; G02F 13/35
(52) U.S. Cl. ........................ 353/119; 353/56; 353/57; 353/60; 349/5
(58) Field of Search ............................. 353/52, 55, 56, 353/57, 58, 60, 61, 119, 121, 122; 349/5, 8, 161

(56) References Cited

U.S. PATENT DOCUMENTS

| 5,676,442 A | * | 10/1997 | Fujimori ...................... 353/119 |
| 5,803,566 A | * | 9/1998 | Ogino ........................... 353/60 |
| 6,085,055 A | * | 7/2000 | Shin et al. ................... 399/250 |
| 6,231,191 B1 | * | 5/2001 | Shiraishi et al. .............. 353/61 |

* cited by examiner

Primary Examiner—Russell Adams
Assistant Examiner—Melissa J Koval
(74) Attorney, Agent, or Firm—Oliff & Berridge, PLC

(57) ABSTRACT

A projector includes an enclosing structure that encloses an optical path from an electrooptical device to a projection lens with a heat insulating member, and a thermoelectric transducer for cooling air inside the enclosing structure. Since the enclosing structure is formed by the heat insulating member, the electrooptical device can be efficiently cooled while thermally blocking between the inside and the outside thereof. Since being enclosed, the entry of dust or oil mist from the outside is prevented, and dust or oil mist does not adhere to the electrooptical device and the like.

6 Claims, 5 Drawing Sheets

OPTICAL PROJECTOR WITH IMAGE ENLARGING AND PROJECTING CAPABILITY AND HEAT INSULATING AND COOLING MEANS

BACKGROUND OF THE INVENTION

1. Field of the Invention

The present invention relates to a projector including an electrooptical device for forming an optical image according to image information, and a projection lens for enlarging and projecting the image formed by the electrooptical device.

2. Description of Related Art

Hitherto, projectors have been used which include a light source, an optical system for modulating light emitted from the light source according to image information to form an optical image, and a projection lens for enlarging and projecting the modulated light. The optical system includes an illuminating optical system for producing a uniform inplane illumination distribution of light emitted from the light source, a color separation optical system for separating the light from the illuminating optical system into three primary colors of red, blue, and green, an electrooptical device for modulating color lights according to image information, and a color-synthesizing optical system for synthesizing the modulated color lights. The electrooptical device includes three optical modulation devices for modulating each of a red light, a blue light, and a green light separated by the color separation optical system according to image information.

As such an optical modulation device, for example, a liquid crystal panel or the like using a polysilicon TFT as a switching element is used. Since the optical modulation devices are important portions for forming an optical image according to image information, if dust or oil mist adheres to the surface of the liquid crystal panel or the like, the image quality of the projector will deteriorate. For this reason, a projector including an enclosing structure for enclosing an optical path from the electrooptical device to the projection lens may be adopted. Since such a projector including the enclosing structure can prevent the entry of dust or oil mist from the outside by the enclosing structure, dust or oil mist does not adhere to the surface of the liquid crystal panel, the image quality of the projector can be stably secured over a long period of time, and the projector is suitably used as a stationary projector device, such as a hanging-type projector.

However, since the optical modulation device, such as the liquid crystal panel, is easily affected by heat, if the optical path from the electrooptical device to the projection lens is enclosed by the enclosing structure as described above, it is difficult to efficiently cool the optical modulation device, i.e., the electrooptical device by introducing cooling air from the outside of the device. In particular, in a recent trend toward an increase in brightness and a reduction in size of the projector, efficiently cooling the electrooptical device is an important problem.

It is an object of the present invention to provide a projector that is able to efficiently cool an electrooptical device, and to stably secure the image quality over a long period of time.

SUMMARY OF THE INVENTION

The present invention provides a projector which may consist of an electrooptical device for forming an optical image according to image information; and a projection lens for enlarging and projecting the image formed by the electrooptical device; wherein the projector includes an enclosing structure that encloses an optical path from the electrooptical device to the projection lens with a heat insulating member, and a cooling element for cooling the air inside the enclosing structure.

As the heat insulating member, a member formed of plastic, glass fiber, asbestos, or suberin may be employed.

In the present invention as described above, the optical path from the electrooptical device to the projection lens is enclosed by the enclosing structure, and the air inside the enclosing structure is cooled by the cooling element, whereby the electrooptical device can be efficiently cooled. In addition, since the entry of dust or oil mist from the outside is prevented by the enclosing structure, the dust or oil mist does not adhere to the electrooptical device and the like, and the image quality of the projector can be stably secured over a long period of time.

Furthermore, since the enclosing structure is formed by the heat insulating member, the inside and the outside of the enclosing structure are thermally blocked, whereby cooling efficiency of the cooling element is further improved, and dew condensation or the like does not occur.

In the foregoing, a circulating fan for circulating the air inside the enclosing structure may preferably be provided inside the enclosing structure.

This allows the circulating fan to forcibly circulate the air inside the enclosing structure, whereby the electrooptical device can be cooled more efficiently.

In addition, the above-described cooling element may preferably be a thermoelectric transducer including a heat absorption surface facing the inside of the enclosing structure and a heat radiation surface facing the outside of the enclosing structure.

As the thermoelectric transducer, a Peltier element may be adopted by which a phenomenon occurs such that, if two different types of metal or semiconductors are electrically joined in series and a direct current is passed therethrough, heat absorption and heat radiation other than Joule heat occur on the joint thereof.

With this configuration, by exposing the heat absorption surface of the thermoelectric transducer to the inside of the enclosing structure and exposing the heat radiation surface to the outside of the enclosing structure, heat included in the air inside the enclosing structure can be easily radiated to the outside of the enclosing structure, whereby the structure of the cooling element can be simplified and reduced in size.

Furthermore, the heat absorption surface and/or the heat radiation surface may preferably be provided with heat transfer members, each having heat transference.

As the heat transfer member provided on the heat absorption surface, a plate-like member made of aluminum or the like can be employed, and as the heat transfer member provided on the heat radiation surface, a heat radiating fin made of aluminum or the like can be employed.

If the heat absorption surface is provided with the transfer member in this way, by disposing the heat transfer member in an airflow inside the enclosing structure, heat exchange between the internal air and the heat transfer member is smoothly affected, and the heat inside the enclosing structure can be efficiently transferred to the heat absorption surface.

If the heat radiation surface is provided with the heat transfer member, heat can be efficiently radiated from the heat transfer member when the heat is radiated to the outside of the enclosing structure from the heat radiation surface. That is, by providing the heat transfer members on the heat absorption surface and the heat radiation surface, heat absorption operation and heat radiation operation of the thermoelectric transducer can be efficiently affected.

In addition, a cooling fan for cooling the heat transfer members may preferably be provided at a position opposing the heat transfer member provided on the heat radiation surface.

This allows a heat transfer member to be forcibly cooled. Therefore, the temperature rise inside the device due to the heat radiation from the heat transfer member can be prevented. In addition, since the heat transfer member is forcibly cooled, heat is efficiently transferred from the heat radiation surface to the heat transfer member, and heat radiation operation of the thermoelectric transducer is efficiently affected also in this respect.

DETAILED DESCRIPTION OF THE EMBODIMENT

An embodiment of the present invention will now be described with reference to the drawings.

(1) Overall Configuration of the Device

Figure 1:
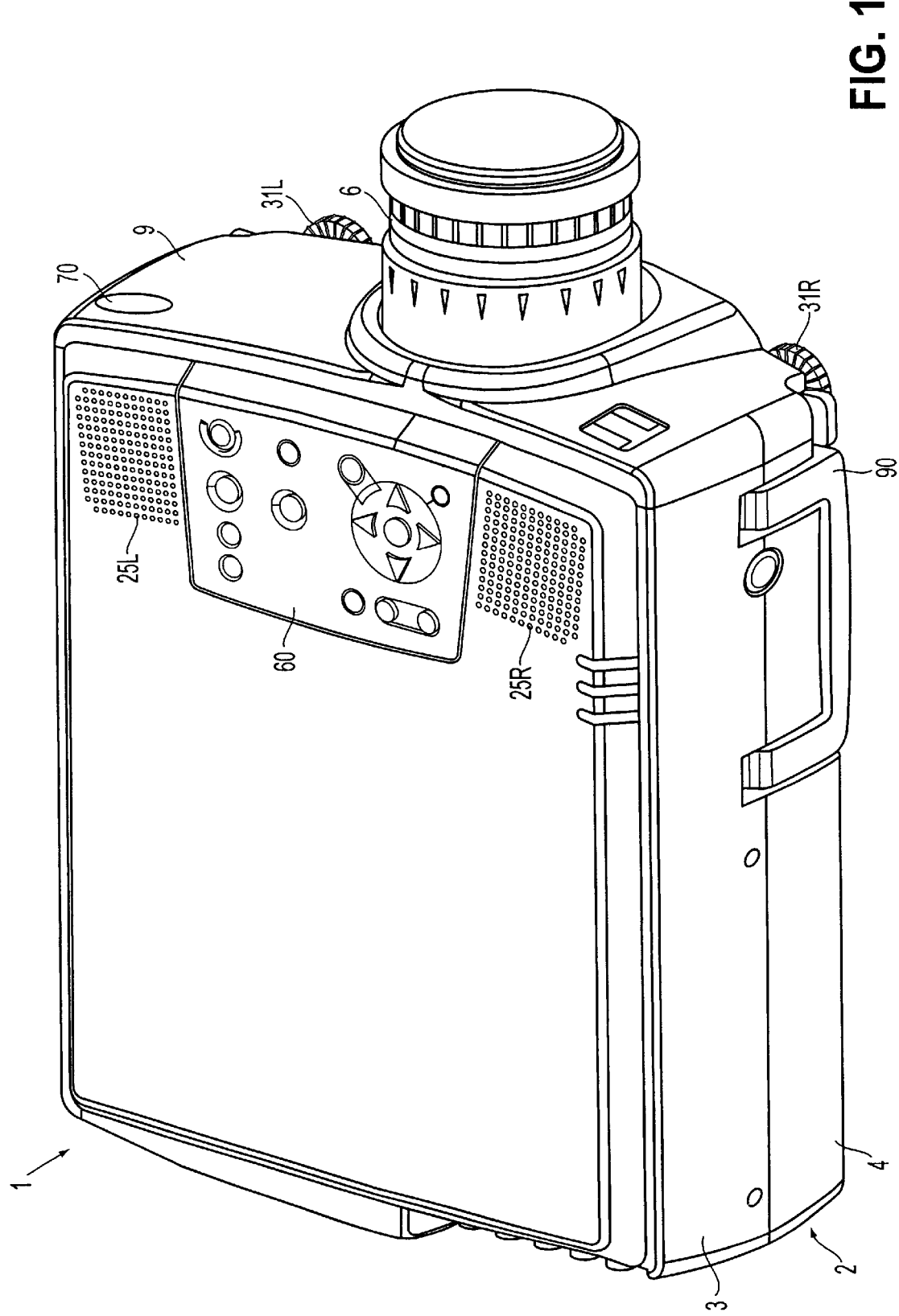
FIG. 1 is an outward perspective view of a projector according to an embodiment of the present invention as viewed from the top side.
Figure 2:
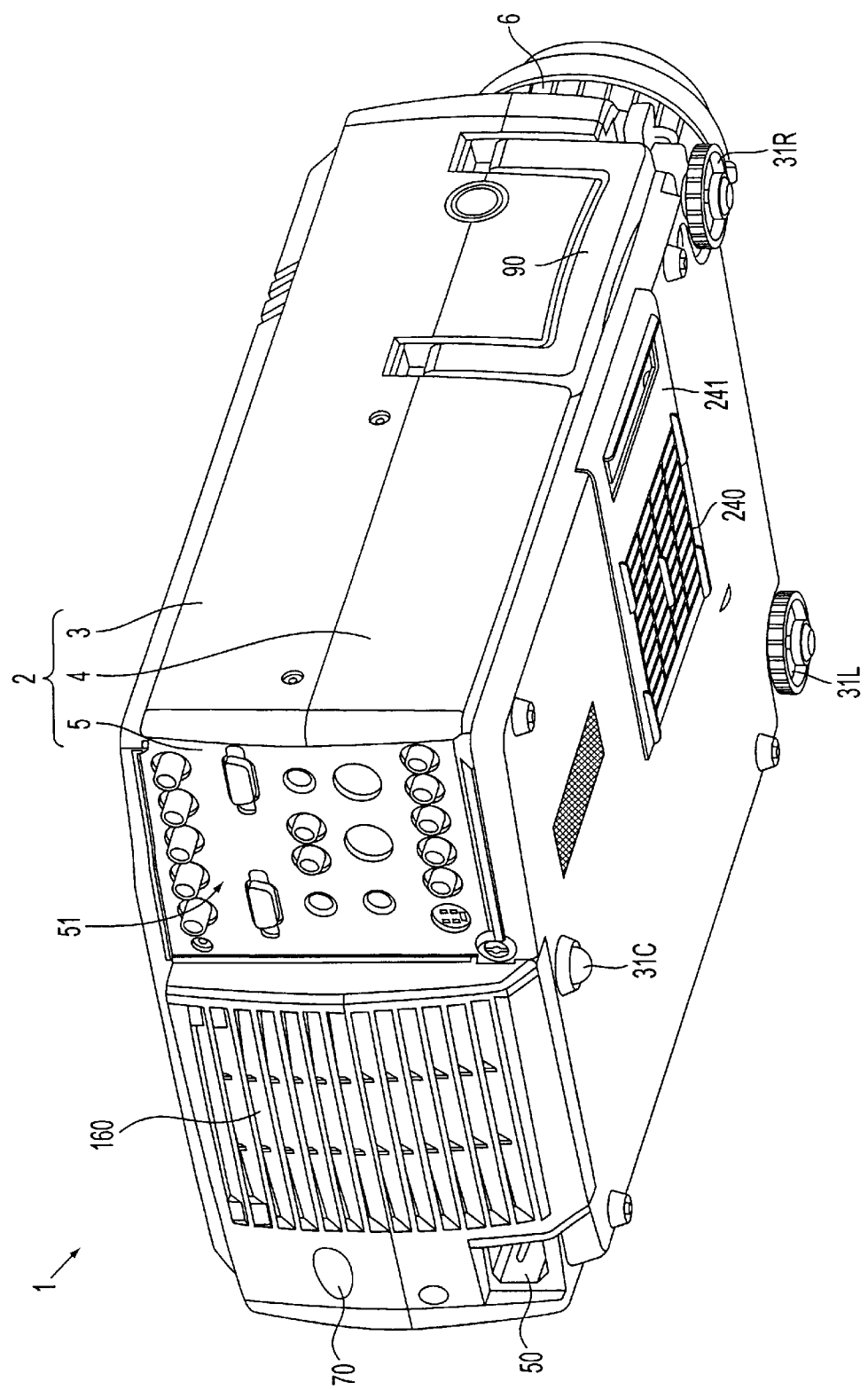
FIG. 2 is an outward perspective view of the projector in the embodiment as viewed from the bottom side.

FIGS. 1 and 2 are schematic perspective views of a projector 1 according to this embodiment. FIG. 1 is a perspective view as viewed from the top side, and FIG. 2 is a perspective view as viewed from the bottom side.

The projector 1 is of a type that separates a light emitted from a light source lamp serving as a light source into three primary colors of red (R), green (G), and blue (B), that modulates these color lights according to image information through liquid crystal panels constituting an electrooptical device, that synthesizes the modulated lights of respective colors by a prism (color-synthesizing optical system), and that enlarges and displays the synthesized lights onto a projection plane via a projection lens 6. Components are accommodated in an outer casing 2 serving as housing except a part of the projection lens 6.

(2) Structure of Outer Casing

The outer casing 2 basically consists of an upper casing 3 for covering the top surface of the device, a lower casing 4 constituting the bottom surface of the device, a rear casing 5 (FIG. 2) for covering a rear surface, and a front casing 9 for covering a front surface, and these casings are made of metal, such as magnesium, except that the rear casing 5 is made of resin.

As shown in FIG. 1, many communication holes 25R and 25L for speakers are formed at right and left ends of the front side of the top surface of the upper casing 3. In addition, a control panel 60 for adjusting the image quality and the like of the projector 1 is provided between the communication holes 25R and 25L. Furthermore, a light-receiving section 70 is provided at the upper right portion of the front surface of the front casing 9 so as to receive optical signals from a remote controller that is not shown in the figure.

As shown in FIG. 2, in substantially the center of the bottom surface of the lower casing 4, there is provided an air inlet 240 for taking in cooling air for cooling the inside of the device. The air inlet 240 is provided in a filter replacement cover 241 made of resin, and the filter replacement cover 241 is attached to and detached from the side surface of the lower casing 4, whereby an internal filter can be replaced.

In addition, the bottom surface of the lower casing 4 is provided with feet 31R and 31L at the left and right front end corners thereof, and a foot 31C at substantially the rear end center. By controlling the amount of vertical extension or retraction of the feet 31R and 31L, the inclination of the display screen can be changed.

One raised section of the lower casing 4 is provided with a handle 90 for carrying the device 1.

As shown in FIG. 2, the rear casing 5 has an AC inlet 50 for supplying external electric power, various types of input-output terminals 51 disposed thereon, and an air outlet 160 serving as a ventilation hole for exhausting air inside the device formed adjacent to the input-output terminals. The rear casing 5 is also provided with a light-receiving section 70 in a manner similar to the front casing 9.

(3) Internal Structure of the Device

Figure 3:
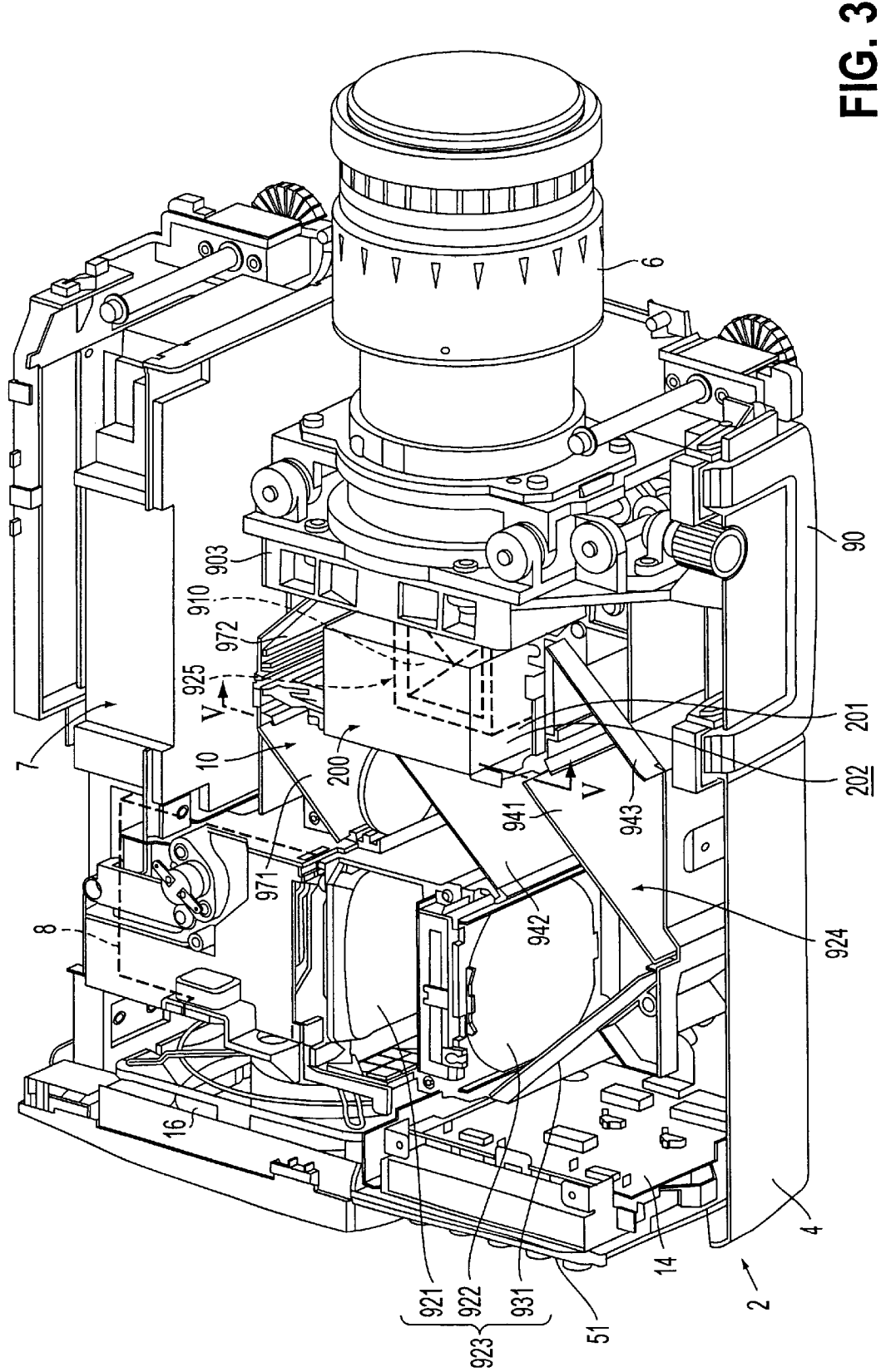
FIG. 3 is a perspective view showing the internal structure of the projector in the embodiment.

FIG. 3 shows the internal structure of the projector 1.

As shown in this figure, a power supply unit 7 serving as a power supply disposed on one side of a projection lens 6, a light source lamp unit 8 disposed rearward of the power supply unit 7, an optical unit 10 constituting an optical system, a driver board (not shown) for driving an electrooptical device 925 provided in the unit 10, and a main board (not shown) for controlling the overall device 1 are accommodated in the device 1.

The power supply unit 7 transforms electric power from the AC inlet 50 shown in FIG. 2 to supply the power to the light source lamp unit 8, the driver board, the main board, intake fans (not shown) disposed below or both above and below the electrooptical device 925, and an exhaust fan 16 disposed rearward of the light source lamp unit 8, and the power supply unit 7 includes a lamp-driving board for driving a light source lamp 181 of the light source lamp unit 8, in addition to a power-supply circuit board having a power supply filter, a transformer, a rectifying circuit, a smoothing circuit, and a voltage-regulating circuit, etc. formed thereon.

Figure 4:
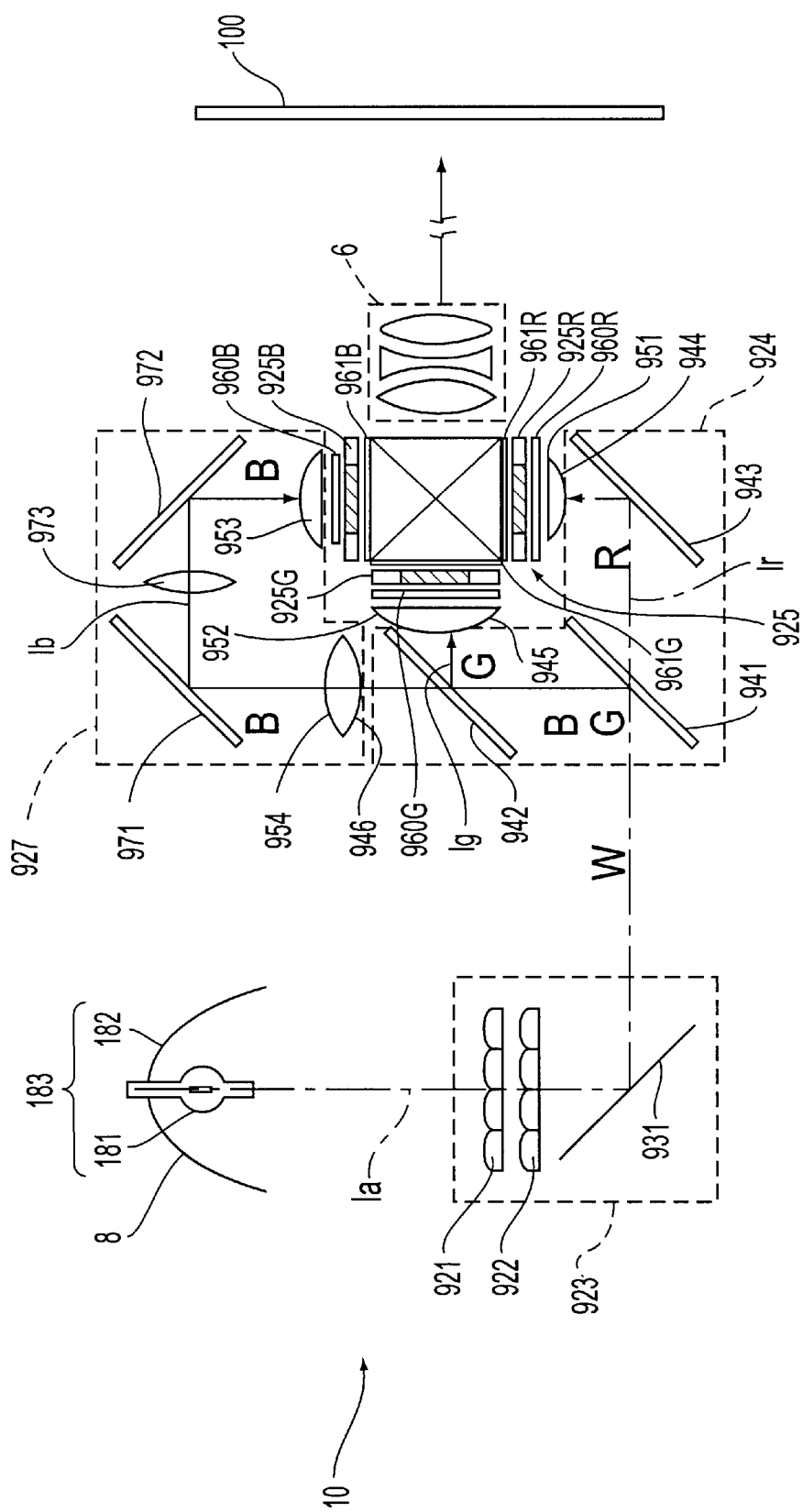
FIG. 4 is a schematic diagram for the explanation of the structure of an optical system in the embodiment.

The light source lamp unit 8 constitutes a light source section of the projector 1, and includes, as shown in FIG. 4, a light source device 183 consisting of the light source lamp 181 and a reflector 182, and a lamp housing (not shown) for accommodating the light source device 183. Such a light source lamp unit 8 is cooled by cooling air from the above-described intake fans, and cooling air drawn from a clearance between the outer casing 2 and the projection lens 6. The cooling air first cools the power supply unit 7 and the like immediately after being drawn, then flows rearward so as to cool almost all of the area inside the device 1, and most of the cooling air finally passes through the light source lamp unit 8 to be exhausted by the exhaust fan 16 provided behind the light source lamp unit 8. Therefore, the light source lamp unit 8 is disposed just in front of the exhaust fan 16, whereby the light source device 183 inside thereof can be efficiently cooled by a large volume of the cooling air.

The optical unit 10 is a unit for optically processing a light emitted from the light source lamp unit 8 to form an optical image corresponding to image information, and includes an illuminating optical system 923, a color separation optical system 924, the electrooptical device 925, and a prism unit 910 serving as a color-synthesizing optical system. Optical elements of the optical unit 10 other than the electrooptical device 925 and the prism unit 910 are vertically held between upper and lower light guides (not shown). The upper light guide and the lower light guide are combined, and are fixed by fixing screw adjacent to the lower casing 4. In addition, these light guides are similarly fixed by fixing screws adjacent to the prism unit 910.

The prism unit 910, shaped like a rectangular parallelepiped, is fixed by fixing screws to a back face of a head body 903 having substantially an L-shaped side face that is composed of an integrally molded article of magnesium, although this is omitted from the figure. In addition, liquid crystal panels 925R, 925G, and 925B constituting the electrooptical device 925 are fixed via fixing members to three side faces of the prism unit 910.

The prism unit 910 and the electrooptical device 925 are enclosed by an enclosed box 202 formed of a heat insulating member 201, such as a plastic, and an optical path from the electrooptical device 925 to the projection lens 6 is formed as an enclosing structure 200.

Furthermore, although it is omitted from the figure, the driver board for driving and controlling the liquid crystal panels 925R, 925G, and 925B of the electrooptical device 925 is disposed above the optical unit 10, and a main board formed with a control circuit for controlling the overall projector 1 is disposed thereon. The main board is electrically connected to the above-described driver board and the control panel 60.

(4) Structure of Optical System

Next, the structure of an optical system of the projector 1, that is, the optical unit 10 will be described with reference to a schematic diagram shown in FIG. 4.

As described above, the optical unit 10 includes the illuminating optical system 923 for producing a uniform in-plane illuminance distribution of light (W) from the light source lamp unit 8, the color separation optical system 924 for separating the light (W) from the illuminating optical system 923 into red (R), green (G), and blue (B), the electrooptical device 925 for modulating color lights R, G, and B according to image information, and the prism unit 910 for synthesizing the modulated color lights. The illuminating optical system 923 includes a first lens plate 921, a second lens plate 922 disposed on the emitting side of the first lens plate 921, and a reflecting mirror 931 for bending a central axis 1a of the light W emitted from the light source lamp unit 8 toward the front of the device 1.

The first lens plate 921 has a plurality of rectangular lenses arranged in a matrix, divides the light emitted from the light source into a plurality of partial lights, and condenses the partial lights near the second lens plate 922.

The second lens plate 922 has a plurality of rectangular lenses arranged in a matrix, and has the function of superimposing partial lights emitted from the first lens plate 921 onto the liquid crystal panels 925R, 925G, and 925B (described later) that constitute the electrooptical device 925.

In this way, in the projector 1 of this embodiment, since the liquid crystal panels 925R, 925G, and 925B can be illuminated with light having substantially uniform illuminance by the illuminating optical system 923, a projected image having no illuminance irregularity can be obtained.

The color separation optical system 924 is composed of a blue-and-green-reflecting dichroic mirror 941, a green-reflecting dichroic mirror 942, and a reflecting mirror 943. Firstly, a blue light B and a green light G included in the light W emitted from the illuminating optical system 923 are reflected at right angles by the blue-and-green-reflecting dichroic mirror 941, and travel toward the green-reflecting dichroic mirror 942.

A red light R passes through the blue-and-green-reflecting dichroic mirror 941, is reflected at right angles by the rearward reflecting mirror 943, and is emitted from an emitting section 944 of the red light R toward the prism unit 910.

Next, only the green light flux G in the blue and green lights B and G reflected by the blue-and-green-reflecting dichroic mirror 941 is reflected at right angles by the green-reflecting dichroic mirror 942, and is emitted from an emitting section 945 of the green light G toward the prism unit 910.

The blue light B passing through the green-reflecting dichroic mirror 942 is emitted from an emitting section 946 of the blue light B toward a relay optical system 927. In this embodiment, all the distances between the emitting section for the light W of the illuminating optical system 923 and the emitting sections 944, 945, and 946 of the color lights R, G, and B in the color separation optical system 924 are set to be equal.

Condenser lenses 951 and 952 are disposed on the emitting sides of the emitting sections 944 and 945 of the red and green lights R and G of the color separation optical system 924. Therefore, the red and green lights R and G emitted from the emitting sections enter the condenser lenses 951 and 952, where they are collimated.

The thus-collimated red and green lights R and G pass through incident-side polarizers 960R and 960G, and enter the liquid crystal panels 925R and 925G serving as optical modulation devices, where they are modulated and given image information corresponding to light of respective colors. That is, these liquid crystal panels 925R and 925G are subjected to switching control according to the image information by the above-described driver board, whereby the light of respective colors having passed therethrough is modulated.

On the other hand, the blue light B is guided to the corresponding liquid crystal panel 925B via a relay optical system 927, where it is similarly modulated according to the image information. As the liquid crystal panels 925R, 925G, and 925B of this embodiment, for example, liquid crystal panels may be employed that use a polycilicon TFT as a switching element.

The relay optical system 927 is composed of a condenser lens 954 disposed on an emitting side of the emitting section 946 of the blue light B, an incident-side reflecting mirror 971, an emitting-side reflecting mirror 972, an intermediate lens 973 disposed between these reflecting mirrors, and a condenser lens 953 disposed before the liquid crystal panel 925B, and the blue light B emitted from the condenser lens 953 passes through the incident-side polarizer 960B to enter the liquid crystal panel 925B, where it is modulated.

In this case, the central axis 1a of the light W, and central axes 1r, 1g, and 1b of the color lights R, G, and B are formed in the same plane. The blue light B has the longest optical path length, that is, the distance between the light source lamp 181 and the liquid crystal panel for the blue light B is the longest, and therefore, the light amount of the light to be lost is the largest. The light loss can, however, be restricted by interposing the relay optical system 927 therebetween.

Next, the color lights R, G, and B modulated through the liquid crystal panels 925R, 925G, and 925B pass through emitting-side polarizers 961R, 961G, and 961B, to be allowed to enter the prism unit 910, where they are synthesized. A color image synthesized by the prism unit 910 is enlarged and projected via the projection lens 6 onto a projection plane 100 located at a predetermined position.

(5) Cooling Structure of Electrooptical Device

Figure 5:
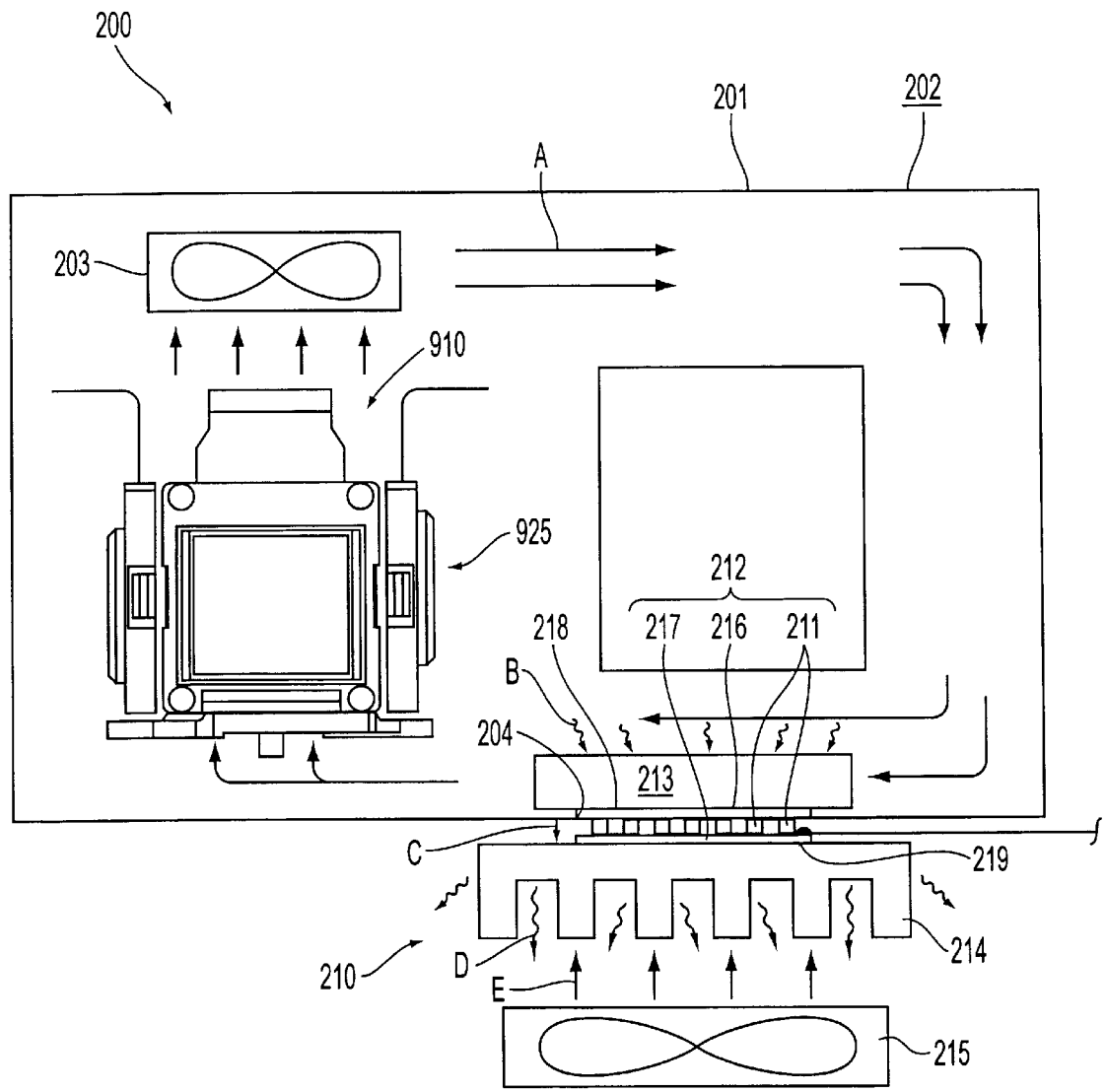
FIG. 5 is a schematic diagram showing a cooling structure of an electrooptical device in the embodiment.

FIG. 5 shows the outline of a cooling structure for the electrooptical device 925 taken along the line V—V in FIG. 3. As described above, the electrooptical device 925 and the prism unit 910 are enclosed by the enclosed box 202 formed of the heat insulating member 201, and the optical path from the electrooptical device 925 to the projection lens 6 is formed as the enclosing structure 200. Although it is omitted from the figure, an opening for guiding the light emitted from the light source to the electrooptical device 925 in the enclosed box 202 is formed in the enclosed box 202. The opening is sealed by a transparent glass. Similarly, an opening is also formed in a partition section between the prism unit 910 and the projection lens 6, and the opening is sealed by the transparent glass.

A circulating fan 203 for forcibly circulating air inside the enclosing structure 200 is provided above the electrooptical device 925. The circulating fan 203 is composed of a centrifugal fan for drawing in air from the direction along the axis of rotation of the fan, and exhausts air in the direction tangential to the rotation of the fan.

An opening 204 for communicating the inside and the outside is formed below the inside of the enclosing structure 200. The opening 204 is provided with a cooling device 210 for cooling the air inside the enclosing structure 200. The cooling device 210 includes a thermoelectric transducer 212 serving as a cooling element for cooling the air inside the enclosing structure 200, two heat transfer members 213 and 214 provided inside and outside the enclosing structure 200, and a cooling fan 215.

The thermoelectric transducer 212 serves as a heat pump by passing a direct current therethrough, and has element bodies 211, each having a plurality of pairs of two types (P-type and N-type) of thermoelectric semiconductors combined in series and electrically connected, and a pair of ceramic substrates 216 and 217 for sandwiching the element bodies 211 from both of upper and lower sides. The thermoelectric transducer 212 is a Peltier element, and if a direct current is passed through the element bodies 211, a phenomenon will occur such that heat flows on the connections of the two types of thermoelectric semiconductors in one direction along the joint surfaces. That is, since heat on one side of the joint surfaces flows toward the other side, one side has the function of absorbing heat, and the other side has the function of radiating heat.

The substrates 216 and 217 are bonded to the side of the element bodies 211 having the heat absorbing function, and the side of the element bodies 211 having the heat radiating function, respectively. This makes the surface of the substrate 216 into an absorption surface 218 where heat absorption occurs, and makes the surface of the substrate 217 into a heat radiation surface 219 where heat radiation occurs. The heat absorption surface 218 is disposed inside the enclosing structure 200 so as to absorb heat transmitted by heat exchange between the air inside the enclosing structure 200 and the heat transfer member 213, which will be described later. The heat radiation surface 219 is disposed outside the enclosing structure 200 so as to radiate the heat absorbed by the heat absorption surface 218 to the outside of the enclosing structure 200.

The heat transfer member 213 provided inside the enclosing structure 200 is a plate-like member made of aluminum having heat transfer properties, is attached to the heat absorption surface 218, and is disposed in an airflow inside the enclosing structure 200 produced by the circulating fan 203. The heat transfer member 214 provided outside the enclosing structure 200 is a heat radiating fin made of aluminum having heat transfer properties, and is attached to the heat radiation surface 219. The cooling fan 215 is intended for cooling the heat transfer member 214, and is provided at a position opposing the heat transfer member 214. By cooling the heat transfer member 214 with the cooling fan 215, whereby temperatures of the substrate 216 and the heat transfer member 213 can be rapidly reduced, and air inside the enclosing structure 200 is rapidly cooled.

Next, the circulation of the air inside the enclosing structure 200 and cooling of the electrooptical device 925 will be described. The air inside the enclosing structure 200 is circulated by the circulating fan 203 through a path shown by the arrow A. The air strikes against the heat transfer member 213 to be cooled by the cooling device 210, and then flows from the lower portion of the electrooptical device 925 toward the upper portion to thereby cool the electrooptical device 925.

The air struck against the heat transfer member 213 is subjected to heat exchange between the air and the heat transfer member 213 (arrow B). The heat transferred to the heat transfer member 213 is absorbed by the heat absorption surface 218 of the thermoelectric transducer 212, and flows to the heat radiation surface 219 via the element bodies 211 (arrow C). The heat is transferred from the heat radiation surface 219 to the heat transfer member 214, and is radiated from the heat transfer member 214 to the outside of the enclosing structure 200 (arrow D). The heat transfer member 214 and the substrate 217 are cooled by the cooling fan 215 (arrow E) to rapidly reduce the temperatures of the substrate 216 and the heat transfer member 213, whereby the air inside the enclosing structure 200 is cooled and the electrooptical device 925 is cooled. Even if the air inside the enclosing structure 200 is cooled, since the enclosing structure 200 is composed of the enclosed box 202 that is formed of the heat insulating member 201, dew condensation or the like does not occur.

(6) Advantages of Embodiment

The above-described embodiment offers the following advantages.

That is, since the optical path from the electrooptical device 925 to the projection lens 6 is enclosed by the enclosing structure 200, and the air inside the enclosing structure 200 is cooled by the thermoelectric transducer 212, the electrooptical device 925 can be efficiently cooled. In addition, since the entry of dust or oil mist from the outside can be prevented by the enclosing structure 200, the image quality of the projector 1 can be stably secured over a long period of time without adhesion of dust or oil mist to the electrooptical device 925 and the like. Furthermore, since the enclosing structure 200 is formed by the heat insulating member 201, the inside and the outside of the enclosing structure 200 are thermally blocked, whereby cooling efficiency of the thermoelectric transducer 212 is further improved, and dew condensation or the like does not occur.

In addition, since the circulating fan 203 is provided, the air inside the enclosing structure 200 is forcibly circulated, whereby the electrooptical device 925 can be cooled more efficiently.

Furthermore, since the heat absorption surface 218 of the thermoelectric transducer 212 is exposed to the inside of the enclosing structure 200 and the heat radiation surface 219 is exposed to the outside of the enclosing structure 200, heat included in the air inside the enclosing structure 200 can be easily radiated to the outside of the enclosing structure 200. This allows the structure of the cooling element to be simplified and reduced in size.

In addition, since the heat absorption surface 218 is provided with the heat transfer member 213 and the heat transfer member 213 is disposed in the airflow inside the enclosing structure 200, heat exchange between the internal air and the heat transfer member 213 can be smoothly affected, whereby the heat inside the enclosing structure 200 can be efficiently transferred to the heat absorption surface 218. Furthermore, since the heat radiation surface 219 is provided with the heat transfer member 214, heat can be efficiently radiated from the heat transfer member 214 when heat is radiated to the outside of the enclosing structure 200 from the heat radiation surface 219.

In addition, since the cooling fan 215 is provided in order to cool the heat transfer member 214, the heat transfer member 214 is forcibly cooled, and the temperature rising inside the device 1 due to the heat radiation from the heat transfer member 214 can be prevented. Furthermore, since the heat transfer member 214 is forcibly cooled, heat is efficiently transferred from the heat radiation surface 219 to the heat transfer member 214, whereby heat radiation operation of the thermoelectric transducer 212 can be efficiently affected.

(7) Modifications of Embodiment

The present invention is not limited to the above-described embodiment, and includes the following modifications.

For example, while the cooling fan 215 is provided in the above embodiment, the cooling fan may not be provided if, for example, the heat transfer member 214 has excellent heat radiating characteristics, and heat is always efficiently transferred from the heat radiation surface 219.

In addition, the heat transfer members 213 and 214 are not limited to be provided on both of the heat absorption surface 218 and the heat radiation surface 219. For example, they may be provided only on the heat absorption surface 218 or on the heat radiation surface 219, and it will be appropriately determined in carrying out the present invention whether they are provided only on the heat absorption 218 or the heat radiation surface 219.

Furthermore, while the heat transfer members 213 and 214 are provided in the above embodiment, they may not be provided if, for example, the heat absorbing operation and the heat radiating operation of the thermoelectric transducer 212 are efficiently affected on the heat absorption surface 218 and the heat radiation surface 219.

In addition, the cooling element is not limited to the thermoelectric transducer 212, and any unit may be used as long as it cools the air inside the enclosing structure 200. The structure, the shape, the element and like of the cooling means may be appropriately determined in carrying out the present invention.

Furthermore, while the circulating fan 203 is provided in the above embodiment, it may not be provided if, for example, the air inside the enclosing structure 200 is circulated by convection utilizing the differences in temperature. However, the provision of the circulating fan 203 may be preferable in that the air inside the enclosing structure 200 is forcibly circulated, and the electrooptical device 925 can be cooled more efficiently.

In addition, while the heat transfer members 213 and 214 are bonded to the substrates 216 and 217 in the above embodiment, the heat transfer members 213 and 214 may be, for example, directly attached to the element bodies 211 by an adhesive agent or the like.

While the electrooptical device 925 is composed of TFT-drive liquid crystal panels 925R, 925G, and 925B in the above embodiment, the present invention may be applied to a projector including an optical modulation device formed by other driving methods, such as a TN, an STN and the like.

While the electrooptical device 925 is composed of the three liquid crystal panels 925R, 925G, and 925B in the above embodiment, the present invention may be applied to an optical modulation device composed of a single or two liquid crystal panels.

In addition, while the panels constituting the electrooptical device 925 are composed of liquid crystal elements in the above embodiment, the present invention may be applied to a projector including an optical modulation device composed of device panels using plasma elements or small-mirror elements other than the liquid crystal.

Furthermore, while the electrooptical device 925 in the above embodiment is of a type that transmits and modulates lights R, G, and B, the present invention may be applied to a projector including a reflective optical modulation device which modulates and emits incident light while reflecting.

Other specific structure, shapes, and the like for carrying out the present invention may be replaced with other structure and the like within a range in which the object of the present invention can be achieved.

What is claimed is:

1. A projector comprising:

an electrooptical device that forms an optical image according to image information;

a projection lens that enlarges and projects the image formed by the electrooptical device;

an enclosing structure comprised of a heat insulating member, the heat insulating member encloses an optical path between the electrooptical device and the projection lens; and a cooling element comprised of a thermoelectric transducer including a heat absorption surface facing an inside of the enclosing structure and a heat radiating surface facing an outside of the enclosing structure.

2. The projector as claimed in claim 1, further comprising a circulating fan that circulates the air inside the enclosing structure provided inside the enclosing structure.

3. The projector as claimed in claim 1, at least one of the heat absorption and the heat radiation surface comprising heat transfer members, each having heat transfer properties.

4. The projector as claimed in claim 3, further comprising a cooling fan that cools the heat transfer members provided at a position opposing a heat transfer member provided on the heat radiation surface.

5. A method for cooling a projector having an electrooptical device and a projection lens, the method comprising:

enclosing an optical path between the electrooptical device and the projection lens in an enclosing structure comprised of a heat insulating member;

absorbing heat inside the enclosing structure with a thermoelectric transducer including a heat absorption surface facing inside of the enclosing structure and a heat radiation surface facing the outside of the enclosing structure; and radiating the heat to outside the enclosing structure.

6. The method as claimed in claim 5, further comprising circulating the air inside the enclosing structure.

* * * * *